United States Patent [19]

Adams et al.

[11] Patent Number: 4,887,872
[45] Date of Patent: Dec. 19, 1989

[54] TRACK ADJUSTER FLOW CONTROL MECHANISM

[75] Inventors: Carl P. Adams, Metamora; William J. Spivey, Jr., Joliet; Thomas E. Oertley, Dunlap, all of Ill.

[73] Assignee: Caterpillar Inc., Peoria, Ill.

[21] Appl. No.: 297,644

[22] Filed: Jan. 17, 1989

[51] Int. Cl.$^4$ .............................................. B62D 55/30
[52] U.S. Cl. .......................................... 305/10; 305/32; 188/305; 267/286; 60/565
[58] Field of Search ........................ 305/10, 29, 31, 32; 188/305; 267/34, 175, 174, 286; 92/175, 181 P, 183; 60/533, 565, 593; 137/329.3

[56] References Cited

U.S. PATENT DOCUMENTS

| | | | |
|---|---|---|---|
| 1,625,044 | 4/1927 | McKeown | 137/329.3 X |
| 2,818,311 | 12/1957 | Ashley, Jr. | 305/10 |
| 3,101,977 | 8/1963 | Hyler et al. | 305/10 |
| 3,409,335 | 11/1968 | Piepho et al. | 305/10 |
| 3,473,328 | 10/1969 | Mayhew | 60/565 X |
| 3,511,327 | 5/1970 | Schlor | 305/10 X |
| 3,647,270 | 3/1972 | Althaus | 305/10 |
| 3,733,107 | 5/1973 | Cote et al. | 305/10 |
| 3,765,730 | 10/1963 | Ishida | 305/10 |
| 3,829,172 | 8/1974 | Oestmann et al. | 305/10 |
| 3,901,563 | 8/1975 | Day | 305/10 |
| 3,905,278 | 9/1975 | Ourdovillie | 92/183 X |
| 3,910,649 | 10/1975 | Roskaft | 305/10 |
| 3,972,191 | 8/1976 | Grabb | 60/553 |
| 3,972,569 | 8/1976 | Bricknell | 305/10 |
| 4,149,757 | 4/1979 | Meisel, Jr. | 305/10 |
| 4,457,564 | 7/1984 | Ruge et al. | 305/10 |
| 4,470,583 | 9/1984 | Peiffer et al. | 267/64 |
| 4,553,344 | 11/1985 | Johnson | 92/183 X |
| 4,681,376 | 7/1987 | Riml | 305/10 |
| 4,712,469 | 12/1987 | Hesse | 91/422 |

FOREIGN PATENT DOCUMENTS 2396686 3/1979 France ................................ 305/10

Primary Examiner—Russell D. Stormer
Attorney, Agent, or Firm—Claude F. White

[57] ABSTRACT

A track adjusting flow controlling mechanism sets the optimum tension or "controlled sag" in the endless track of a track type vehicle. A piston and associated valve assembly control flow of pressurized fluid to a track adjusting clyinder. Movement of the piston tensions the track with substantially no sag ("S") and subsequent retraction of the piston provides correct track tension with an optimum track sag ("S"). Supply of pressurized fluid to the piston and valve assembly is controlled by the vehicle operator from the operator's station. Conventional track adjusting operations require considerable time and effort and are often an undesirable task. In view of this, the adjusting task is often neglected with the resulting rapid wear of the track and related components. The subject track adjusting mechanism provides a quick and simple operation to provide proper track adjustment.

20 Claims, 3 Drawing Sheets

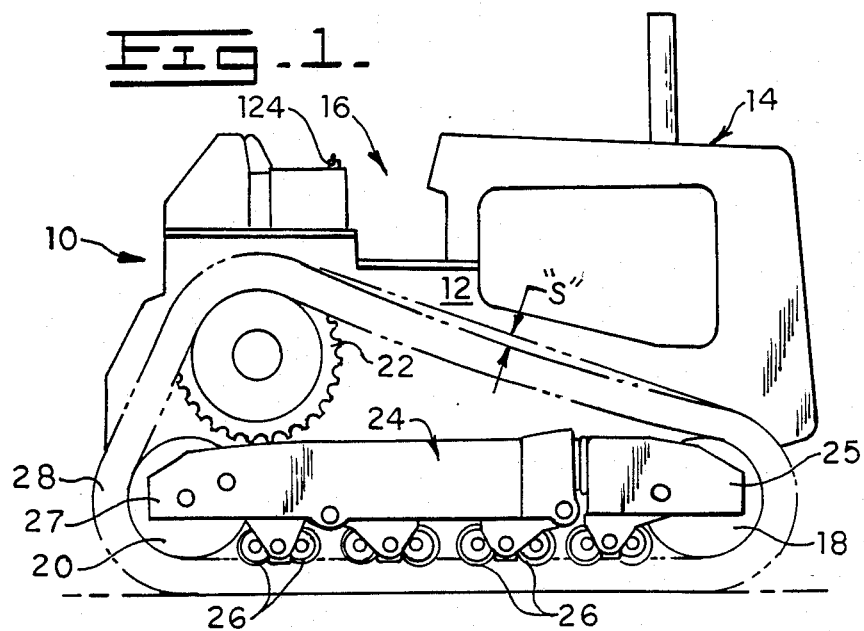
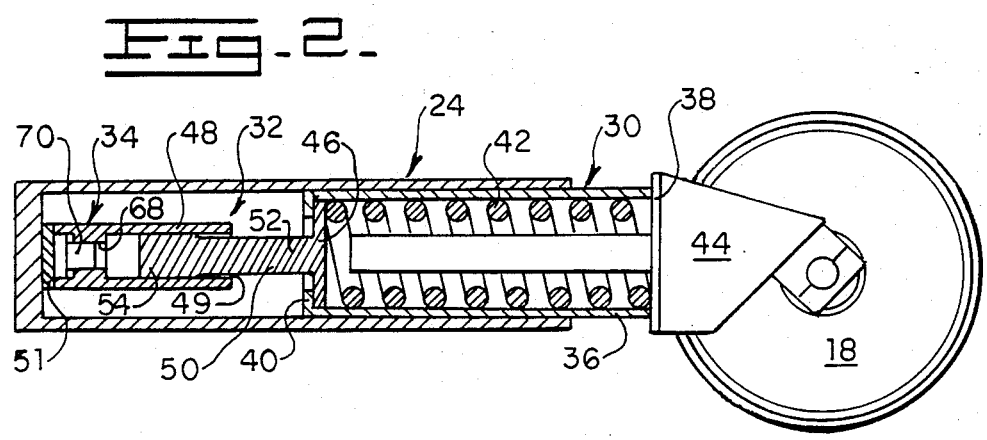

TRACK ADJUSTER FLOW CONTROL MECHANISM

TECHNICAL FIELD

This invention relates to a track adjusting assembly for providing optimum tension in the track of a track-type vehicle and more particularly to a flow control mechanism which controls flow of pressurized fluid to the track adjusting assembly.

BACKGROUND ART

Self-laying track-type vehicles utilize endless loop track assemblies to support and propel the vehicle. The track assembly is typically driven by a toothed sprocket, supported by a plurality of roller wheels, and guided and reversed by one or more large idler wheels. In order to operate effectively, the endless loop track assembly must be tensioned to a specific force. This tension force must be maintained within optimum limits to prolong the useful life of the track assembly.

If the tension force on the track assembly is lower than optimum, the track becomes slack and sags excessively between the drive sprocket and the idler wheel. Such excess slack produces accelerated wear of the track and associated components and generates undesirable noise levels. Excess slack can also cause the track to become disengaged from the drive sprocket. Higher than optimum track tension force produces a tight track which is also detrimental to long track life. An excessively tight track also produces accelerated wear and can cause fracture of the track and related components.

Conventional track adjusting mechanisms and procedures require the machine operator, or a separate maintenance person, to manually measure the track sag and then manually adjust the sag accordingly. Such procedures generally require removal of a cover plate to gain access to the track adjusting mechanism. The adjusting mechanism is conventionally a small track adjusting fluid cylinder, into which a non-compressible fluid is applied by a manually operated pump. Proper track tensioning by this procedure often requires several track measurements and fluid applications. Should the track inadvertently become over tightened by this process, a separate procedure is necessary to drain off some of the excess pressure in the track adjusting fluid cylinder.

Because of the time and effort required to properly adjust the track using the above noted procedures, track adjustment is often neglected. The working environments and inclement weather often make the track adjustment task an unpleasant one, which also promotes neglect of the procedure.

One type of track tensioning apparatus, which does not require the manual manipulations set forth above, is disclosed in U.S. Pat. No. 4,681,376 issued July 21, 1987, to Peter Riml. The apparatus in this patent includes two fluid cylinders interconnected by a fluid passage with a floating piston positioned in the rear fluid cylinder. The piston divides the rear cylinder into two chambers, and a source of fluid pressure is connected to the rear chamber. The source of fluid pressure includes a control valve, a plurality of fluid conduits, and a plurality of check and throttle valves. The floating piston has a spring loaded check valve which opens when pressurized fluid is applied to the chamber behind the piston. Pressurized fluid flows through the floating piston into the forward chamber and into the forward fluid cylinder. Because of a differential pressure within the rear cylinder, the floating piston is forced to move toward the forward cylinder and displaces a track chain tensioning piston within the forward cylinder in order to tension the track chain. Subsequent interruption of the pressurized fluid to the floating piston, and reward movement of the chain tensioning piston relaxes the track chain to its adjusted condition. Although this apparatus would appear to function satisfactorily to set a desired tension in a track assembly, it includes a rather complex hydraulic circuit having a large number of check valves, throttle valves and fluid lines.

Another type of track tensioning apparatus for hydraulically tensioning the chain of a tracklaying vehicle is disclosed in U.S. Pat. No. 3,647,270 issued Mar. 7, 1972, to Ernst Althans. This apparatus utilizes a hydraulic system, including a fluid cylinder and accumulator, to tension the chain and also to absorb recoil of the idler guide wheel. Besides the fluid accumulator, the hydraulic system includes a pump, a plurality of check valves and pressure limiting valves, and a plurality of interconnected fluid lines. Initial recoil forces are absorbed by the hydraulic system and subsequent higher recoil forces are absorbed by a pair of springs. Although this apparatus would appear to tension the chain to some desired tensioning pressure, it does not provide for a controlled slack in the chain. This system is also complex and includes several hydraulic components.

The present invention is directed to overcoming one or more of the problems as set forth above.

DICLOSURE OF THE INVENTION

In one aspect of the present invention, a mechanism for controlling flow of fluid for adjusting the tension in an endless track of a track type vehicle includes a fluid cylinder having walls which define first and second chambers, with the second chamber having a smaller diameter than the first chamber. The mechanism further includes a stepped piston positioned within the cylinder and piloted by the first and second chambers. The piston has a through bore and a valve assembly positioned within the piston bore controls flow of pressurized fluid through the bore.

Proper tension of the endless loop track assemblies of track type vehicles prolongs the useful life of the track components, as well as the service life of related machine components. To maintain the proper tension, or controlled sag, of the track assembly, periodical measurements must be taken and subsequent adjustment procedures accomplished. Because the measuring and adjustment tasks are unpleasant and require considerable time and effort, these tasks are often ignored or delayed. This results in accelerated and excessive wear of the track and other machine components.

The subject invention provides a solution to the above noted problems by providing a flow control mechanism for controlling fluid flow to a track adjusting assembly, with the flow of pressurized fluid being controlled from the vehicle operator's compartment. The track adjusting procedure is thereby quickly accomplished by the vehicle operator in the comfort of the operator's compartment.

BRIEF DESCRIPTION OF THE DRAWINGS

FIG. 1 is a diagrammatic side elevational view of a track-type vehicle incorporating the track adjuster flow control mechanism of the present invention;

FIG. 2 is a diagrammatic side elevational view, partly in section, and on an enlarged scale, of the front idler wheel and track adjuster mechanism of the vehicle shown FIG. 1;

BEST MODE FOR CARRYING OUT THE INVENTION

Figure 3:
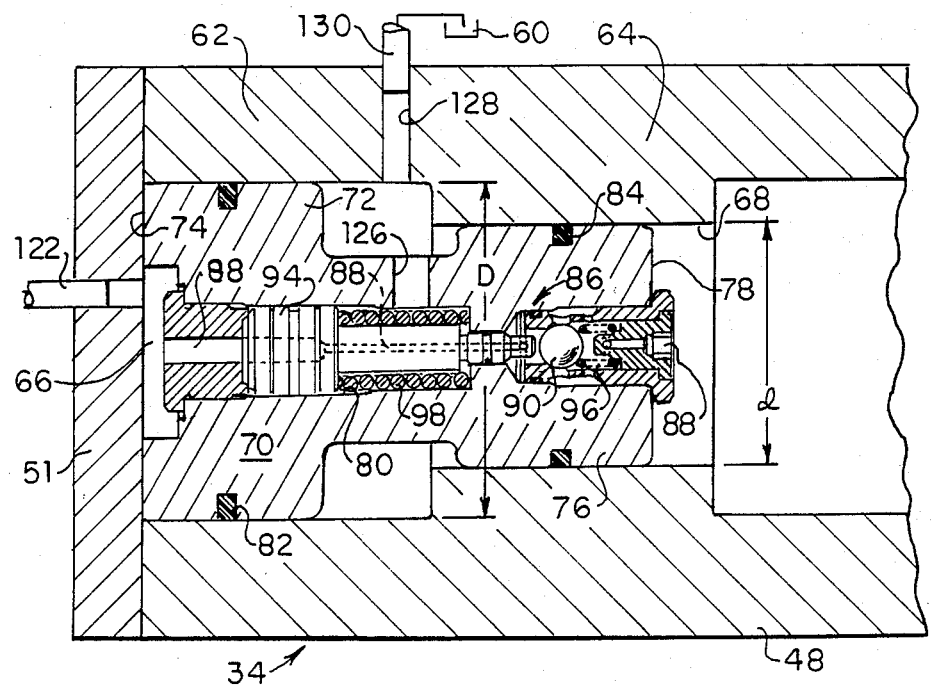
FIG. 3 is a diagrammatic sectional view, on an enlarged scale, of the flow control mechanism shown in FIG. 2.

With reference to the drawings, and in particular FIGS. 1 and 2, a track type vehicle 10 has a frame 12, an engine 14, an operator's station 16, first and second idler wheels 18, 20, a drive sprocket 22, a roller frame assembly 24, a plurality of guide roller 26, and an endless track 28 encircling the frame assembly 24, the rollers 26, the idler wheels 18, 20 and the sprocket 22. It is to be understood that many of the vehicle components, including the idler wheels 18, 20, the sprocket 22, the roller frame assembly 24, the guide rollers 26, and the endless track 28, are duplicated on the side of the vehicle not shown. Since these duplicate components operate in the same manner as those shown and described, the description and operation of the components illustrated applies to both sides of the vehicle.

The roller frame assembly 24 has first and second end portions 25 and 27 with the first idler wheel 18 associated with the first end portion 25 and the second idler wheel 20 associated with the second end portion 27. The frame assembly 24 houses a track recoil assembly 30 and a track tension adjusting mechanism 32, including a fluid flow controlling mechanism 34. The track recoil assembly 30 includes a first non-fluid cylinder 36 having first and second ends walls 38, 40, and a large diameter steel coil spring 42 positioned within the cylinder 36 and compressed between the first and second end walls 38, 40. The idler wheel 18 is rotatably supported by a bracket 44 which is secured to the first end wall 38. A piston 46 is positioned within the first cylinder 36 between the spring 42 and the second end wall 40. Since the spring 42 is in a compressed state, the piston 46, is normally in contact with the spring 42 and the second end wall 40.

With particular reference to FIGS. 2, 3, 4 and 5, the track tension adjusting mechanism 32 includes a second fluid cylinder 48 substantially coaxial with the first cylinder 36, a rod member 50, and the flow controlling mechanism 34. The fluid cylinder 48 has a first open end 49 and a second closed end 51. The rod member 50 has a first end portion 52 connected to the piston 46 and a second end portion 54 positioned within the open end 49 of the fluid cylinder 48. A source of pressurized fluid 56 is selectively available to the flow controlling mechanism 34. The pressurized fluid source 56 includes a fluid pump 58 and a fluid reservoir 60.

The fluid cylinder 48 has wall portions 62, 64 which define first and second chambers 66, 68, with the first chamber 66 having a diameter D and the second chamber 68 having a smaller diameter d. A stepped piston 70 is movably positioned within the first and second chambers 66, 68 and between the second end portion 54 of the rod member 50 and the closed end 51 of the fluid cylinder 48. The piston 70 has a first portion 72 having a first surface 74 and a second portion 76 having a second surface 78. The first portion 72 is positioned in and piloted by the first chamber 66 and the second portion 76 is positioned in and piloted by the second chamber 68. A stepped through bore, or passageway, 80 connects the first surface 74 to the second surface 78. The area of the first surface 74 is larger than the area of the second surface 78 and both surfaces are exposable, under certain circumstances, to the source of fluid pressure 56. A first seal 82 seals the first piston portion 72 with the respect to the wall portion 62 and a second seal 84 seals the second piston portion 76 with respect to the wall portion 64. A pressure sensitive control valve assembly 86 is positioned within the stepped bore 80 of the piston 70 and serves to selectively control flow of pressurized fluid through the bore 80.

Figure 4:
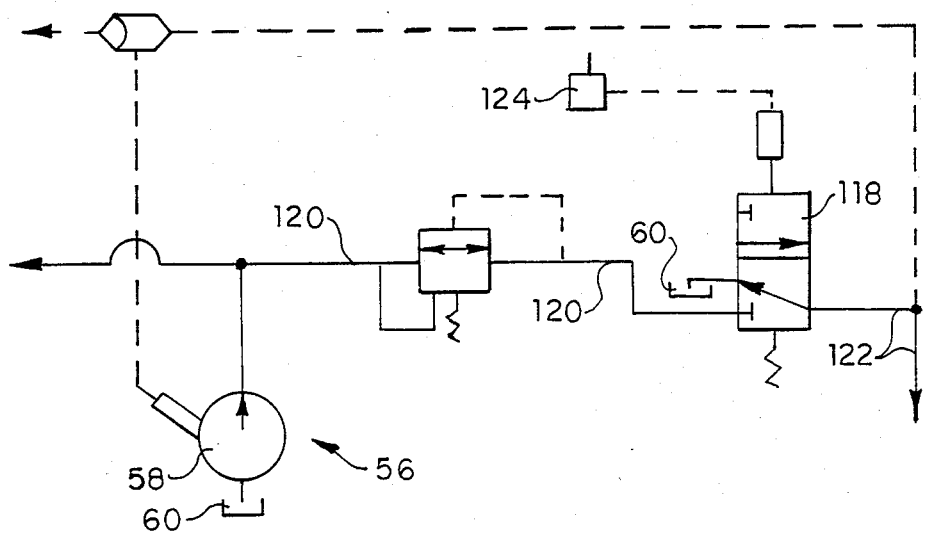
FIG. 4 is a schematic view of the hydraulic circuit used to activate the track adjuster flow control mechanism of the present invention.
Figure 5:
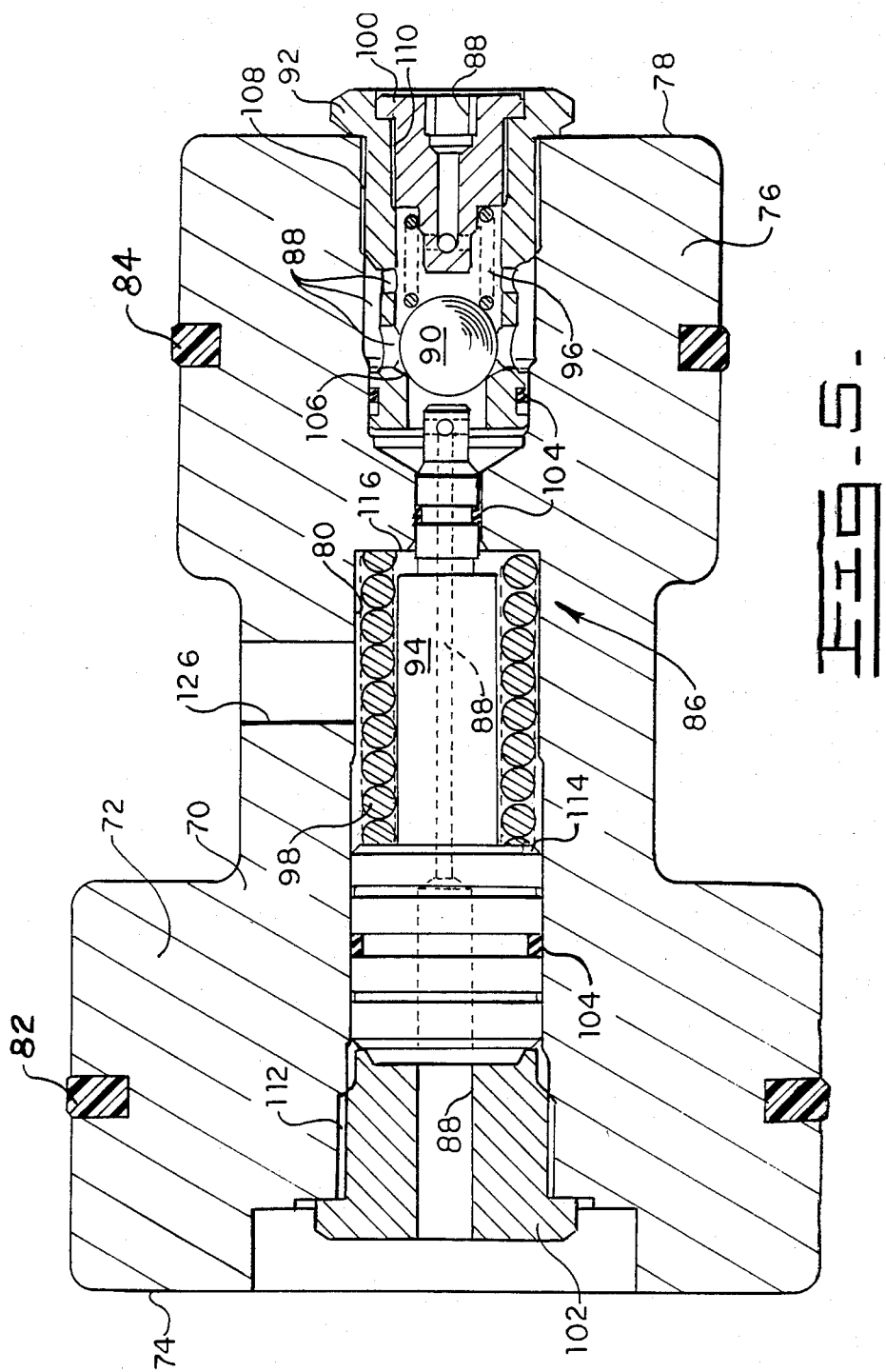
FIG. 5 is a diagrammatic sectional view on an enlarged scale, of the stepped piston and pressure sensitive control valve assembly of the flow control mechanism shown in FIG. 3.

With particular reference to FIGS. 3, 4 and 5, the pressure sensitive control valve assembly 86 has a fluid pathway 88 extending therethrough and a pressure actuated closure member 90 is positioned within the pathway 88. The closure member 90, in the form of a ball valve 90, is in fluid communication with the first and second chambers 66, 68 and is selectively moveable between closed and open positions. The closure member 90 is moveable to the open position, which provides fluid flow between the first and second chambers 66, 68, in response to fluid pressure in the first chamber 66 being greater than the fluid pressure in the second chamber 68. Likewise, the closure member 90 is moveable to the closed position, which blocks fluid flow between the first and second chambers 66, 68, in response to fluid pressure in the second chamber 68 being greater than the fluid pressure in the first chamber 66.

The valve assembly 86 further includes a sleeve member 92, a plunger 94, first and second biasing means in the form of springs 96, 98, first and second compressing means in the form of threaded members 100, 102, and a plurality of seals 104 for sealing the various components of the valve assembly relative to the stepped piston bore 80. The sleeve member 92 has a valve seat 106 and the ball valve 90, which is positioned within the sleeve member 92, is adapted to contact the valve seat 106. The sleeve 92 is secured within the piston bore 80, adjacent the second portion 76 of the piston 70, by thread means 108. The first threaded member 100 is secured within the sleeve 92 by threads 110 and compresses the spring 96, which biases the ball valve 90 toward and against the valve seat 106. The compressed spring 96 keeps the ball valve 90 biased to this closed position until the ball valve is unseated by a force which is greater than the combined bias of the spring 96 and the fluid force in the chamber 68.

The second threaded member 102 is secured within the stepped bore 80 by threads 112 and contacts the plunger 94 as it is threaded into the bore 80. The spring 98 is thereby compressed between a shoulder 114 on the plunger 94 and a step 116 in the bore 80, which serves to bias the plunger 94 away from the valve seat 106. The bias on the spring 98 is therefore set by the second threaded member 102. When a force, such as pressurized fluid, is applied against the plunger 94, it will move within the bore 80, further compress the spring 98, contact the ball valve 90, and move the ball valve 90 away from the valve seat 106. When the ball valve 90 is spaced from the valve seat 106, the fluid pathway 88 is established through the first and second threaded members 100, 102, and through the sleeve 92 and the plunger 94 to connect the first chamber 66 to the second chamber 68.

With particular reference to FIGS. 3 and 4, a variable position fluid control valve 118 is in fluid communication with the fluid pump 58 through fluid line 120, and with the flow controlling mechanism 34 through fluid line 122. The position of the valve 118 is controlled by a switch 124 which is conveniently located within the operator's station 16. Any leakage of fluid past the seals 104, 82, and 84 will flow through openings 126 and 128 and line 130 back to the reservoir 60.

INDUSTRIAL APPLICABILITY

With reference to the drawings, the subject track adjuster flow control mechanism 34 is particularly useful for adjusting the tension, or controlled sag "s", in the endless track 28 of a track type vehicle 10. The track adjusting mechanism 32, including the flow controlling mechanism 34, is controlled by the vehicle operator from the operator's station 16. Proper adjustment prolongs the useful life of the endless track 28 and related components, including the idler wheels 18, 20, the guide rollers 26, and the drive sprocket 22.

In the embodiment illustrated, when the vehicle operator wishes to set the proper tension in the endless track 28, he activates the control switch 124, which is conveniently located within the operator's station 16. The switch 124 sends a signal to the control valve 118 and shifts the valve 118 to an open position. With the valve 118 in this position, pressurized fluid flows from the pump 58, through line 120, valve 118, and line 122, to the flow controlling mechanism 34. The pressurized fluid enters the chamber 66 and acts upon the plunger 94 which moves to the right, as viewed in FIGS. 3 and 5. Movement of the plunger 94 compresses the spring 98, causing the plunger 94 to contact the ball valve 90, and moves the ball valve 90 out of contact with the valve seat 106, and further compresses the spring 96. The fluid pathway 88 is thereby opened between the chamber 66 and the chamber 68, and fluid pressure in the chambers 66 and 68 quickly equalizes. Because the surface area 74 is larger than the surface area 78, the stepped piston 70 shifts forward, or to the right as viewed in FIGS. 2 and 3.

The fluid pressure in the chamber 68 and the cylinder 48 moves the rod member 50 and the piston 46 forward against the spring 42. This causes the cylinder 36 and the associated idler wheel 18 to move forward and tighten the endless chain 28 and eliminate substantially all the slack from the chain 28. At this time, the vehicle operator de-activates the switch 124 which shifts the control valve 118 to the closed position, as shown in FIG. 4, and opens the line 122 and the chamber 66 to the tank 60. The spring 98 moves the plunger 94 backward, and the spring 96 and fluid pressure in the chamber 68 re-seats the ball valve 90 against the valve seat 106. Pressurized fluid is now trapped in the chamber 68 and the cylinder 48. This pressurized fluid acts against the piston 70 and moves it rearward, or to the left as viewed in FIGS. 2 and 3. The cylinder 36 and the idler wheel 18 are now free to move a predetermined fixed distance rearward, which relaxes the tension in the chain 28 and establishes the desired sag "s". The entire operation takes only a few seconds, and the vehicle operator can repeat the adjustment procedure whenever he desires to do so.

If for some reason, such as packing of foreign material between the track 28 and the idler wheel 18, the pressure in the chamber 68 is higher than the pressure in the chamber 66, when the chamber 66 is supplied with pressurized fluid from the pump 58, the plunger 94 can still unseat the ball valve 90 and equalize the pressure in the chambers 66 and 68. This is possible because of the fluid pressure acting on the larger area on the end of the plunger 94 as compared to the sealing area of the valve seat 106.

Other aspects, objects and advantages of the present invention can be obtained from a study of the drawings, the disclosure, and the appended claims.

We claim:

1. A mechanism for controlling flow of fluid, comprising:
    a fluid cylinder having walls defining first and second chambers said first chamber having a diameter D and said second chamber having a smaller diameter d;
    a stepped piston having a first portion, a second portion, and a through bore, said first portion being positioned in and piloted by said first chamber, said second portion being positioned in and piloted by said second chamber, said piston being moveable within said first and second chambers;
    means for sealing each piston portion relative to its associated cylinder wall; and
    a valve assembly positioned within said stepped piston bore, said valve assembly having a fluid path therethrough and a pressure actuated closure member positioned within said fluid path and in fluid communication with said first and second chambers, said closure member being moveable by said valve assembly to an open position between said first and second chambers in response to fluid pressure in said first chamber being greater than fluid pressure in said second chamber, and to a closed position at which said fluid path between said first and second chambers is closed in response to fluid pressure in said second chamber being greater than the fluid pressure in said first chamber.

2. The mechanism, as set forth in claim 1, including means for sealing said valve assembly relative to said piston bore.

3. The mechanism, as set forth in claim 1, wherein said valve assembly includes a sleeve having a valve seat, and said closure member is a ball valve positioned within said sleeve, said ball valve being adapted to contact said valve seat.

4. The mechanism, as set forth in claim 3, wherein said sleeve is secured within said piston bore adjacent said second portion.

5. The mechanism, as set forth in claim 3, wherein said valve assembly further includes a first means for biasing said ball valve toward said valve seat.

6. The mechanism, as set forth in claim 5, wherein said valve assembly further includes first means for setting the bias on said first biasing means.

7. The mechanism, as set forth in claim 6, wherein said first means includes a first threaded member secured within said sleeve.

8. The mechanism, as set forth in claim 3, wherein said valve assembly further includes a plunger, said plunger being adapted to move within said bore, contact said ball valve, and move said ball valve away from said valve seat.

9. The mechanism, as set forth in claim 8, wherein said valve assembly further includes a second means for biasing said plunger away from said valve seat.

10. The mechanism, as set forth in claim 9, wherein said valve assembly further includes second means for setting the bias on said second biasing means.

11. The mechanism, as set forth in claim 10, wherein said second means includes a second threaded member secured within said piston bore adjacent said first portion.

12. The mechanism, as set forth in claim 11, wherein said fluid path is formed through said first and second threaded members through said sleeve, and through said plunger, said path connecting said first chamber to said second chamber when said ball valve is spaced from said valve seat.

13. A mechanism for adjusting the tension in an endless track of a track type vehicle, said vehicle having a frame structure having first and second end portions, a first wheel associated with said first end portion of said frame structure, a second wheel adjacent said second end portion of said frame structure, a track encircling said frame structure and said first and second wheels, a first cylinder having first and second end walls and being connected to said first wheel, a spring positioned within said first cylinder, a piston positioned within said first cylinder between said spring and said second end wall and in contact with said spring, a second cylinder substantially coaxial with said first cylinder, a rod member having first and second end portions, said first end portion being connected to said piston and said second end portion being positioned within said second cylinder, and a source of pressurized fluid, said adjusting mechanism comprising:

a stepped piston positioned within and axially moveable along said second cylinder, said stepped piston having first and second surfaces, said first and second surfaces being exposable to said pressurized fluid, the area of said first surface being larger than the area of said second surface; and pressure sensitive control means positioned within said stepped piston passageway for controlling flow of pressurized fluid through said passageway.

14. The adjusting mechanism, as set forth in claim 13, wherein said second cylinder has an open end and a closed end and said stepped piston is positioned in said second cylinder between said rod member second end portion and said closed end.

15. The adjusting mechanism, as set forth in claim 13, including a variable position fluid control valve in fluid communication with said source of pressurized fluid and with said stepped piston.

16. The adjusting mechanism, as set forth in claim 15, wherein said vehicle includes an operator's station having means for controlling the position of said fluid control valve.

17. The adjusting mechanism, as set forth in claim 16, wherein said means for controlling includes a control switch.

18. The adjusting mechanism, as set forth in claim 13, wherein said pressure sensitive control means includes a ball check valve spring biased to a normally closed position.

19. The adjusting mechanism, as set forth in claim 18, wherein said pressure sensitive control means includes a plunger spring biased in a direction away from said ball check valve.

20. The adjusting mechanism, as set forth in claim 19, wherein said plunger has a bore therethrough, said bore providing a fluid path.

* * * * *